United States Patent

[11] 3,542,448

| [72] | Inventors | Jerry L. Reynolds<br>Wappingers Falls;<br>Rodman S. Schools, Poughkeepsie; Glenn<br>T. Sincerbox, Wappingers Falls, New York |
|---|---|---|
| [21] | Appl. No. | 609,062 |
| [22] | Filed | Jan. 13, 1967 |
| [45] | Patented | Nov. 24, 1970 |
| [73] | Assignee | International Business Machines<br>Corporation<br>Armonk, New York<br>a corporation of New York |

[54] HOLOGRAPHIC RECORDING AND READOUT OF DIGITAL INFORMATION
10 Claims, 9 Drawing Figs.

[52] U.S. Cl. .................................................. 350/3.5
[51] Int. Cl. ................................................ G02b 27/00
[50] Field of Search .......................................... 350/3.5;
307/312; 250/220

[56] References Cited
UNITED STATES PATENTS
3,296,594  1/1967  Van Heerden .............. 350/3.5

OTHER REFERENCES

Erdoes, "Holographic Information Storage and Retrieval," IBM Technical Disclosure Bulletin, vol. 9, No. 3, August 1966.

Gabor, "Character Recognition by Holography," Nature, vol. 208, pp. 422-423, Oct. 30, 1965.

Reimann & Kosonocky, "Progress in Optical Computer Research," IEEE Spectrum, vol. 2, No. 3, March 1965. (p. 187).

Vitols, "Hologram Memory for Storing Digital Data," IBM Technical Disclosure Bulletin, vol. 8, No. 11, April 1966.

Eaglesfield, "Holograms: What Uses Have They?", Discovery, June 1966, pp. 25-26.

*Primary Examiner*—David Schonberg
*Assistant Examiner*—Robert L. Sherman
*Attorney*—Sughrue, Rothwell, Mion, Zinn and MacPeak ABSTRACT: A method of storing digital information holographically. A matrix of light sources, which supplies the information to be stored, is placed in the signal plane and illuminates the photographic medium. A reference beam floods the photographic medium causing interference with the light from the light sources resulting in a hologram of the matrix of light sources. To detect whether any particular light source of the matrix was "ON" during storage, the developed hologram is flooded with light from the particular light source at the same position occupied by the particular light source during storage. A photodetector, placed at the image point of the reference source detects the reconstructed reference beam which occurs only if the particular light was "ON" during storage. Many matrices of "ON-OFF" data light sources may be stored on a single photographic plate, each matrix occupying a subarea of the photographic plate. A plurality of reference light sources are used, each being at a different angular position with respect to the storage medium and each being focused on a different subarea of the medium. A single matrix of light sources floods the entire medium and is used to store information in all of the subareas. The recording of the several matrices of information is sequential in that at any one time a single reference beam is energized and a plurality of the data sources are energized forming a hologram of the information in a subarea. Next, a new reference source is energized and a new plurality of the same data light sources are energized thereby forming a hologram of the new matrix of information in a new subarea. After development of the photographic storage medium, a given data position in all holographically stored matrices may be read out simultaneously by flooding the entire hologram with light from a light source at said given data position. In response to the light interrogation, the subareas will cause either a reconstruction of the reference beam or no reconstruction of the reference beam depending upon whether the data light source at the position of interest was "ON" or "OFF" during recording. Photodetectors, one for each reference source, are placed at the image points of the reference sources respectively, thereby determining, for each matrix, whether the data source was "ON" or "OFF".

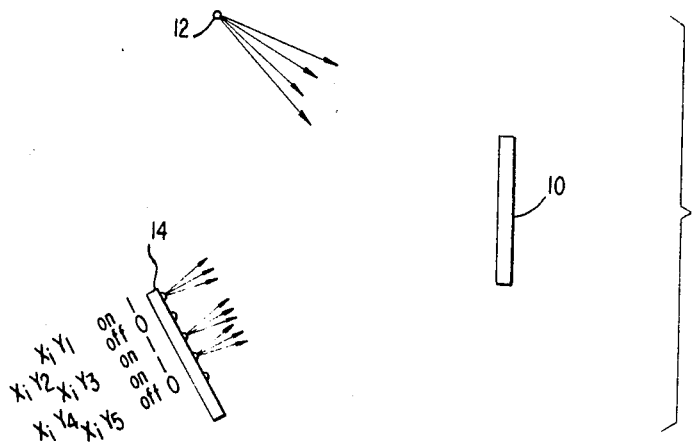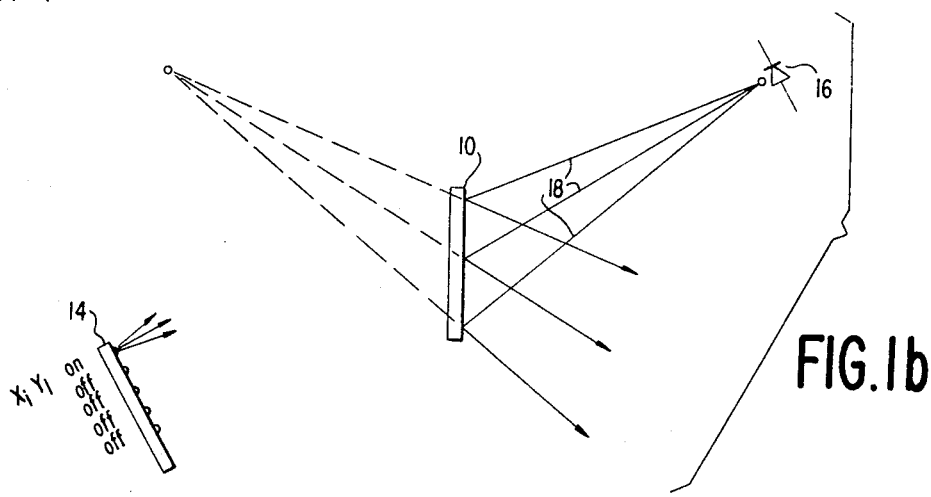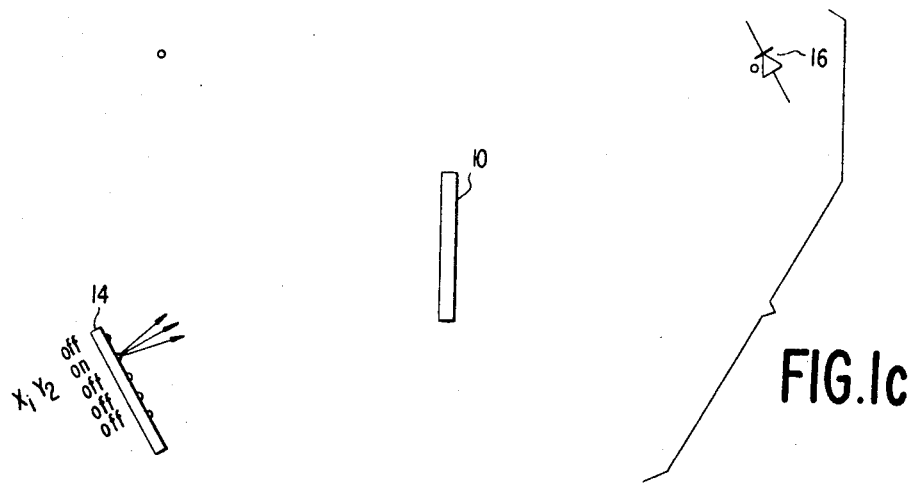

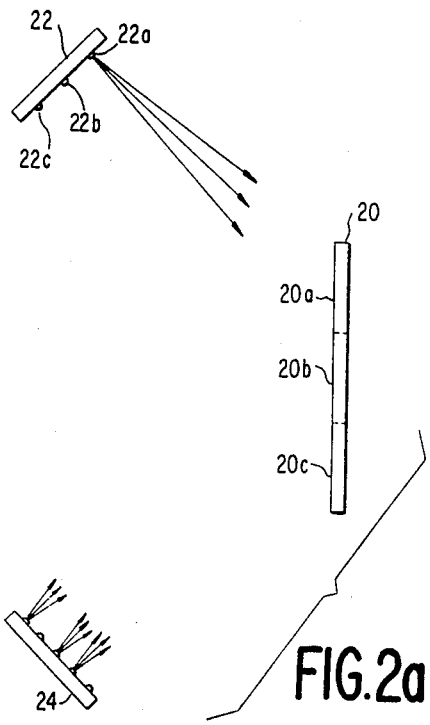
FIG.2a
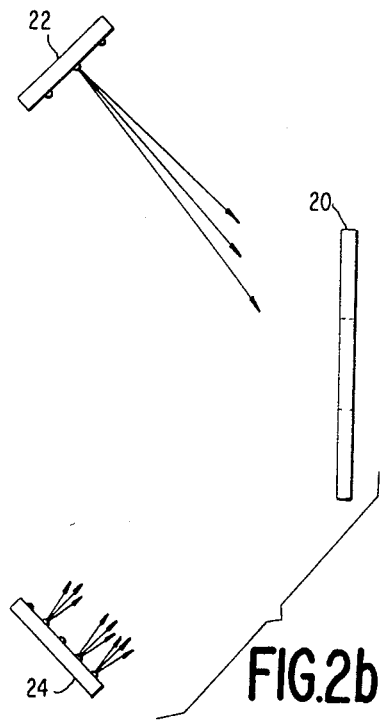
FIG.2b
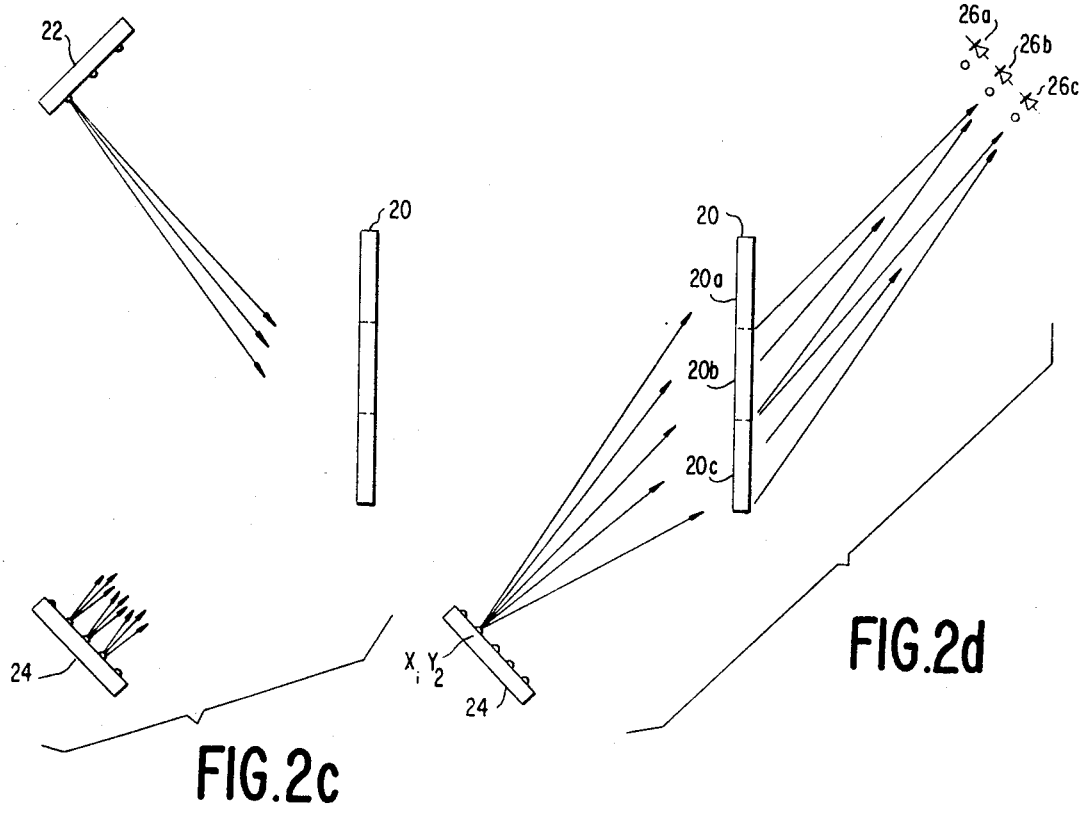
FIG.2c
FIG.2d

HOLOGRAPHIC RECORDING AND READOUT OF DIGITAL INFORMATION

In the prior art, holographic techniques have been used for storage and readout of a block of information. For example, light from the object which constitutes the information interferes with a reference beam in the holographic plane resulting in a hologram of the object. The entire object can be reconstructed by illuminating the hologram with a reference beam. The prior art does not show how to use holograms as associative memories wherein selected bits of the holographically stored data may be read out individually on command. It is also known in the prior art to shift the angular position of the reference beam or the object with respect to the hologram plane for the purpose of recording multiple objects on the photographic plate. However, no prior art teaches storage of blocks of digital data and the readout of a single bit of data by illuminating the hologram with a beam from an angular position corresponding to the position of the original data in the object plane.

In general, the method for recording the information in accordance with the present invention is as follows: A matrix of light sources is positioned in a plane in front of a photographic plate so that light from the light sources will flood the photographic plate. The plane of the matrix of data light sources is referred to herein as the signal plane, and the plane of the photographic plate is referred to herein as the hologram plane. Each data light source represents a single binary bit and is defined by its position in the overall matrix. For example, the data source $X_i Y_j$ refers to the light source in the $I^{th}$ column and the $J^{th}$ row. Each light source may be either "ON" or "OFF", those which are "ON" will be holographically stored on the photographic plate and those which are "OFF" will not be stored on the photographic plate. A reference beam emanating from a position other than that of the data sources also floods the photographic plate causing the required interference with the light from the data sources thereby resulting in the hologram. The photographic film is developed resulting in a hologram of the "ON" light sources. creates In general, the method for reading out a single bit of information from the hologram in accordance with the present invention is as follows: The developed hologram is placed in the hologram plane and the matrix of data light sources is placed in the signal plane. Both the matrix and the hologram occupy the identical relative positions that they occupy during the recording process. A photodetector is placed at the image point of the reference source. The image point of the reference source is at the same angle and distance from the hologram as was the reference source during the recording process, except that the image point is on the opposite side of the hologram as is well known in the art. For reading out a single bit of information from the hologram, the data light source corresponding to the desired bit is energized thereby causing the light therefrom to flood the hologram. If the bit was recorded, the interaction of the light from the light source and the hologram creates a reconstruction of the reference beam which impinges upon the photocell at the image point. The photocell thereby indicates that the interrogated bit has been stored. On the other hand, if the desired bit was not stored during the recording process, reconstruction of the reference beam will not take place and therefore there will be no light impinging on the photodetector indicating that the bit was not stored. The presence of a bit in a certain location may correspond to a binary one whereas the absence of a bit at that location corresponds to a binary zero.

A better understanding of the invention may be had from the detailed description below which refers to the drawings wherein:

FIGS. 1A through 1C are diagrams illustrating the method of storing and reading out bits of data in accordance with the present invention;

FIGS. 2A through 2D are diagrams illustrating the method of recording a plurality of matrices of digital information and reading out a single bit from each stored matrix in accordance with the present invention.

Figure 3A:
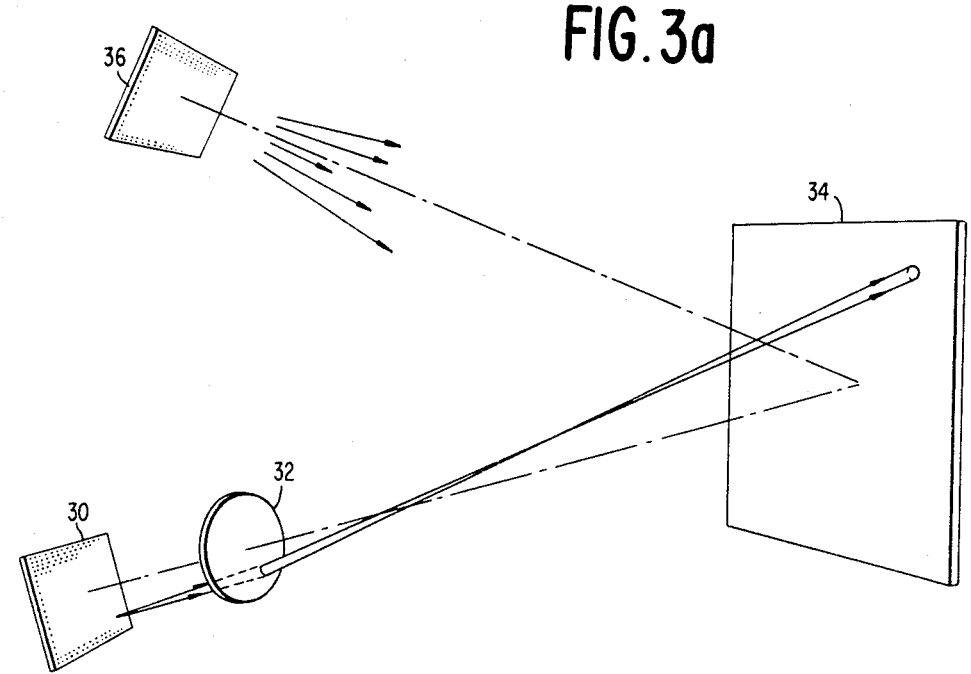
FIGS. 3A and 3B also are diagrams illustrating a method of storing and reading out large quantities of information in accordance with the present invention.

The holographic process is very well known in the art and only a brief description will be given herein. Information storage is achieved by recording the interference between a signal beam and a reference beam of radiation. This permits a recording of both phase and amplitude in the signal radiation whereas conventional photography only records the intensity of the signal radiation. By illuminating the record, or hologram, with the reference beam, the signal radiation is reconstructed. Also, it is possible to reconstruct the reference beam by illuminating the record, or hologram, with the signal radiation. In the present invention, each data light source represents an individual source of signal radiation, and may be individually reconstructed by illuminating the hologram with light therefrom. The data light sources and also the reference source may be, for example, ejection lasers or pin holes in a mask which is flooded with light from a laser beam. In either case, the pin holes or the injection lasers are effectively point sources of light which are holographically recorded on the photographic medium due to their interference with the reference beam.

The invention is illustrated generally in FIGS. 1A through 1C which shows a photographic plate 10 placed in the hologram plane as is well known in the art, a reference source 12, which, for example, may be an injection laser, positioned to flood the photographic plate with light therefrom, and a matrix of light sources 14, each of which may, for example, be an injection laser, also positioned to flood the photographic plate with light therefrom. The position of the matrix of light sources is referred to herein as the signal plane and the position of the reference source is referred to herein as the reference point. The position of the different elements shown in FIGS. 1A through 1B is referred to as the recording geometry and is well known in prior art holography. The important factor being that the reference beam interferes with the signal beam on the photographic plate to record the created interference pattern.

FIGS. 1B and 1C also show a photodetector 16 positioned at the image point of the reference source. The image point of the reference source is at the same distance from the hologram plane as the reference source 12, and is at the same angular position with respect to the hologram plane as the reference source. The difference being that the image point is in the back of the hologram whereas the reference source is in the front of the hologram. The position of the image, created during reconstruction, is a subject well known in the art of holographic recording and reconstruction.

In FIG. 1, only a single line or column, $X_i$, of the matrix 14 is shown for purposes of simplicity in explaining the invention. However, it should be understood that many more columns and also many more rows are contemplated within the spirit of the invention. As shown, the column contains five light sources which are the data light sources. The combination of data light sources may have any of the possible "ON-OFF" patterns. For purposes of explanation, an "ON" source corresponds to a binary one, and an "OFF" source corresponds to a binary zero. Thus, as shown, the matrix of information to be recorded is 10110. For recording the latter matrix of information, the reference beam is turned on, and data sources $X_i Y_1$, $X_i Y_3$, and $X_i Y_4$, are turned on whereas data sources $X_i Y_2$ and $X_i Y_5$ are left off. The photographic plate is developed and thereby becomes a hologram of the matrix of information which was displayed during recording by the matrix of data light sources.

As is well known, the entire recorded signal, which in this instance corresponds to the matrix of light sources, can be reconstructed by directing the reference beam alone at the developed hologram. However, in order to use the hologram as an associative memory, it is necessary to achieve single bit readout. This is accomplished by energizing the data light source corresponding to the single bit in question. If the light source was on during recording, the reference beam will be reconstructed and focused at the image point of the reference source wherein it will be detected by a photodetector. On the other hand, if the data bit of interest was not on during recording, there will be no reconstruction of the reference beam.

FIG. 1B shows readout for bit $X_i Y_1$. The data source at position $X_i Y_1$ is turned on thereby flooding the developed hologram. Due to the nature of holograms, the reference beam will be reconstructed, as indicated by arrows 18, and will be focused to the image point wherein it energized photodetector 16. Many circuits are well known for providing an output indication in response to minimum light detection by a photodetector, and since it is well known in the art, it is not deemed necessary to disclose such a circuit herein. However, it should be noted that such a circuit is contemplated for connection to photodetector 16. Thus, if a "1" bit corresponding to the interrogation bit had been stored in the hologram, the photodetector will provide an output indication.

In FIG. 1C, it is desired to read out bit $X_i Y_2$ from the hologram, and this is accomplished by turning on the data source at position $X_i Y_2$ and flooding the hologram with light therefrom. Since the data source was "OFF", corresponding to a binary zero, during recording, the light from the data source will not cause a reconstruction of the reference beam and, therefore, there will be no light detected by the photodetector 16.

It should be noted that the separation between any two adjacent data light sources in the light source matrix should be such that the two adjacent light sources create an angle with the hologram plane that is outside of the angle of discrimination of the hologram plane. The angle of discrimination of any photographic plate which is used for forming holograms, is not a standard factor but depends upon the thickness of the photographic emulsion. However, even though it is not a standard factor, it may be easily determined by anyone skilled in the art desiring to carry out the present process. A simple way of determining the required separation of the data light sources would be to use a system similar to that shown in FIG. 1B, except that a single data light source rather than a matrix of data light sources would be used. The data light source would be turned on and holographically recorded on a photographic emulsion placed in a hologram plane by creating an interference with the reference beam. Following development of the photographic emulsion, the position of the data source would be noted and it would then be turned on, causing a reconstruction of the reference beam which is detected by the photodetector. Next, the data source, still turned on, would be moved away from its original position until such time as the reference beam is no longer reconstructed and detected by the photodector. When that occurs, the new position of the data source is noted, and the difference between the old and new positions is sufficient for separation of any two adjacent data sources in the matrix.

As an example, it has been determined that an arc of discrimination of about one or 2° can be obtained, using Eastman Kodak's 649F spectroscopic plate. Also, others have found that ten minutes of arc of discrimination is possible with much thicker photographic materials, for example, two millimeters thickness.

FIGS. 2A through 2C illustrate the method for recording a plurality of matrices of information. In this process, it is only necessary to use a single matrix of data light sources 24, but more than a single reference source must be used. The number of reference sources is equal to the number of matrices of information to be recorded, each matrix being recorded on a separate subarea of the hologram. The matrix of data sources 24 is positioned so that light from any of the individual data sources floods the entire photographic plate 20. The reference sources are positioned, or light optics are used, to cause the individual reference beams to flood only a subarea of the photographic plate. For example, as shown in the drawings, the reference beam 22A floods only subarea 20A, the reference source 22B floods only subarea 20B, and light from reference source 22C floods only subarea 20C. The recordings are carried out sequentially. The matrix of data sources is energized to form a first information matrix and the first reference 22A is turned on thereby resulting in a recording of the first matrix of information in holographic form on the photographic plate at subarea 20A. Next, a new matrix is formed by the matrix of data light sources and the second reference beam 22B is turned on creating a hologram of the new matrix at subarea 20B. A third matrix of light information is then created by the matrix of data sources and the third reference beam 22C is turned on creating a hologram of the third matrix at subarea 20C. Although only a single row of data light sources is shown at the data matrix 24, it should be well understood that the matrix includes many rows and many columns of individual light sources. Electronic circuitry for turning on selected "1's" of the data light sources is well known in the prior art and it is, therefore, not deemed necessary to disclose any particular circuitry herein.

As will be apparent from the above description and from the drawings, the information 10110 is holographically recorded on subarea 20A, as shown in FIG. 2A, the information 01011 is holographically recorded in subarea 20B, as indicated in FIG. 2B, and the information 01110 is recorded in subarea 20C, as indicated in FIG. 2C. During the recording on any subarea, it may be necessary to mask the other subareas. This could be accomplished by an opaque mask having a hole therein which is the same size as a subarea. The mask could be moved so that the hole is positioned successively over the different subareas for recording the different matrices of information.

During readout of a hologram formed in accordance with the method shown in FIGS. 2A through 2C, only a single bit is interrogated at any one time, but all matrices are interrogated simultaneously thereby providing a readout of the interrogated bit position from each recorded matrix. The readout method is illustrated in FIG. 2D which shows the data source matrix 24, the hologram 20 and photodetectors 26A through 26C.

Each photocell reads out the information from a single recorded matrix, and each is positioned at the image point of the corresponding reference source. For example, photocell 26A is placed at the image point of reference source 22A, photocell 26B is positioned at the image point of reference source 22B, and photocell 26C is positioned at the image point of reference 22C. Thus, when a single data source, such as data source $X_i Y_2$, as indicated in FIG. 2D, it is turned on for interrogation, each of the subareas which recorded a bit at position $X_i Y_2$ will reconstruct the respective reference beam. For example, data source $X_i Y_2$ was "OFF" during the recording of the first matrix of information in submemory 1. Therefore, during readout, the light from source $X_i Y_2$ interacting with the hologram is subarea 20A will not cause a reconstruction of the reference beam and, therefore, there will be no light detected by photodetector 26A. During the recording of the second and third matrices, data source $X_i Y_2$ was "ON" and, therefore, during the readout process, subareas 20B and 20C will cause reconstruction of the reference beams and the light therefrom will impinge upon photodetectors 26B and 26C.

The method described is particularly suited for usage as an associative memory Assume, for example, that each matrix of information is the complete personal file of an employee. A format is used so that the various entries, such as name, age, man number, sex, etc. have predetermined starting points; i.e., hair color may start at $(X_i Y_j)$ and run to $(X_i Y_j + 3)$. One then might ask the question: Which employees have "blond" hair' The code or tag for "blond" might be 1011. Hence, one turns the $(X_i Y_j)$ data source on and looks, via a comparator circuit, at the submemory detectors for all those submemories that have a "1" in the $(X_i Y_j)$ position. The detectors are gated on for subsequent detection of the remaining bits in the tag. The data source at $(X_i Y_j)$ is turned off and the data source at $(X_i$ $Y_j + 1$) is turned on. The set of detectors determined by the first operation is now looked at for "0's". This determines a smaller set that satisfies the first two digits. This procedure is carried out for each of the tag bits and the detectors remaining at the end indicate which submemories, (matrices) relate to "blond" employees. This information may then be used to give the individual names by switching through the lasers that correspond to name, position and looking at the output of only those detectors. Alternatively, one could look at the detectors indicating "blond" and to a further associative process on another item, such as age. This could be repeated for as many cross correlations as desired. An essential point of this technique is that only a few operations are necessary to determine which of the numerous matrices of information contain the desired information. This is limited by only the speed at which one data source (laser) is turned off and another turned on.

Another application is to use the ($X_i Y_j$) submemory the entire word is presented simultaneously to the detector plane. This "word" could also be used to control gate circuits, one for each matrix. That is, all of the ($X_i Y_j$) bits constitute A microprogram such that energizing the ($X_i Y_j$) laser transforms this program to the detector plane, the output of which controls a large number of circuits, one for each matrix.

At present, photographic film used for holography has a resolution well in excess of one thousand lines per millimeter. This means that according to the present method, it is possible to store at least $10^6$ bits in a 1 millimeter square. Assuming a reasonable memory plate to be 10 centimeters ×10 centimeters in size, we can then have $10^4$ submemories. The total content of the memory would be in excess of $10^{10}$ bits of information. Such a large memory may be generated and used as illustrated in FIG. 3.

Figure 3B:
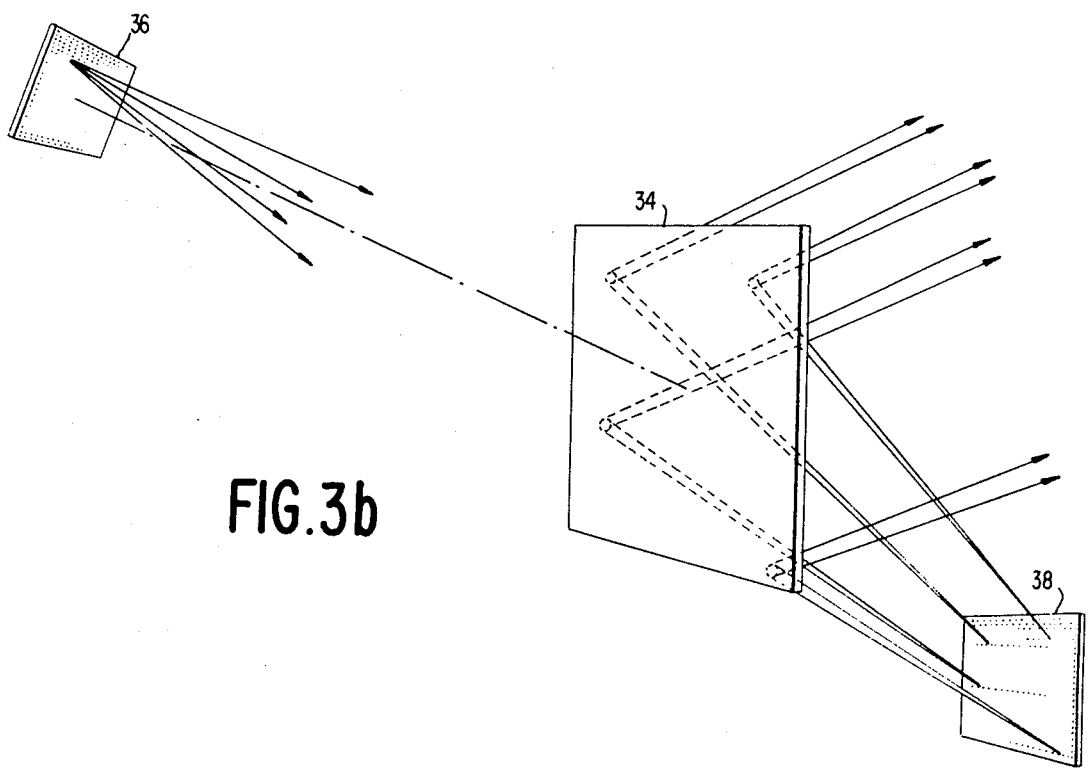

As shown in FIG. 3, the reference beams are generated from a matrix array 30 of 100 × 100 injection lasers, electronically controlled so that only one is turned on at a time. An optical system 32, projects the output of the laser onto the photographic plate 34 to illuminate the desired 1 millimeter square area. Each millimeter square area would correspond to a different subarea wherein a different matrix of information is to be stored. The information matrix is generated by a matrix array 36 of 1000 × 1000 injection lasers such that the desired combination may be turned on, or all of them turned on with the desired combination being selected by an aperture mask. (The aperture mask may be made by using the laser array to expose high speed film in the necessary pattern). The resulting light distribution is allowed to flood the photographic plate. A hologram is generated in only that area where the signal and the reference beams overlap. All other areas receive a low level uniform exposure. If it is necessary, the low level exposure may be eliminated entirely by using a mask in front of the plate 34 so that only the desired area is exposed. A mask for each location may be used by placing these on a roll of film and indexing these into position each time a new area is to be exposed. After development of the exposed photographic plate, the hologram is repositioned and simultaneously readout of all ($X_i Y_j$) information is accomplished, as shown in FIG. 3B, by turning on the ($X_i Y_j$) laser. The information is detected by placing a matrix array of photodetectors 38 (100 × 100) at the real image focal plane of the reference matrix. Only one detector is necessary for each submemory.

It will be apparent to those skilled in the art that if one wished to sacrifice speed, light thoughput, size and low power consumption, then the laser arrays could be replaced with digital light deflectors in both the recording and readout methods.

It will also be understood by those having ordinary skill in the art that the "matrix of light sources" may be a single light, such as a laser beam, in combination with a mask having holes therein. When the mask is flooded with the laser beam, each hole becomes a "light source" in the sense that the phrase is used herein.

Different combinations of "turned-on" sources from the same "matrix of light sources" could be accomplished by using a different mask for each combination and placing each mask in the identical position with respect to the laser beam and the photographic storage medium.

We claim:
1. A method of storing information on and reading information from a photographic stoorage medium comprising the steps of:
   a. forming a hologram on an area of said storage medium of an object which is a matrix of data light sources some of which are on and some of which are off by directing said data light sources and a point source reference light source at said area;
   b. interrogating said hologram by directing light at said hologram from a point in space corresponding to one of said data light sources; and
   c. detecting the reconstructed reference light from said interrogated hologram.

2. The method as claimed in claim 1 wherein the step of forming a hologram comprises:
   a. selectively energizing some light sources in a matrix of data light sources which is in a signal plane;
   b. directing the light from said light sources to flood said area;
   c. flooding said area with light from a point reference light source so that light from said reference source interferes with light from said data sources at said area; and
   d. developing said storage medium.

3. A method of storing a plurality of matrices of information on a plurality of subareas of a photographic plate wherein said information to be recorded is in the form of a combination of "ON" light sources in a matrix of data light sources positioned to illuminate said photographic plate comprising the steps of:
   a. exposing a first subarea of said photographic plate to the interference pattern created by the light from a first combination of said turned on data light sources and a point source reference beam;
   b. exposing other subareas to other interference patterns, respectively, created by other combinations of said turned on data light sources, respectively, and other point source reference beams, respectively, all of said reference beams emanating from different angles with respect to said photographic plate; and
   c. developing the photographic plate.

4. The method as claimed in claim 3 wherein all subareas other than the particular subarea to be exposed at any time are masked with an opaque mask.

5. The method as claimed in claim 4 wherein all light sources are injection lasers.

6. The method as claimed in claim 4 wherein all light sources are pin holes in a mask through which a laser beam passes.

7. A method for reading out all holograms which contain a selected bit of information wherein each hologram has been formed by holographically recording an individual matrix of information in the form of "turned-on" light sources within a matrix of data light sources, the same matrix of light sources having been used to form all of the said holograms, and each matrix of information having formed a separate hologram in a separate subarea of a photographic storage medium due to interference with a separate point reference beam, respectively, comprising the steps of:
   a. flooding all said subareas with light from a single data light source at a position corresponding to the position of data light source ($X_i Y_j$) during recording which represents said selected bit; and
   b. detecting the reconstructed reference beams resulting from said flooding at the real image points of sources of said reference beams.

8. A method of storing a plurality of matrices of digital information on a plurality of subareas of a photographic plate and reading out information, wherein said information to be recorded is in the form of "ON" light sources in a matrix of data light sources positioned to illuminate said photographic plate comprising the steps of:
  a. exposing a first subarea of said photographic plate to an interference pattern created by the light from a first combination of turned on light sources in said matrix of data light sources and a first point source reference beam;
  b. exposing other subareas sequentially to other interference patterns, respectively, created by other combinations of turned on data light sources, respectively, in said matrix of data light sources and other point source reference beams, respectively, all of said reference beams emanating from different positions with respect to said photographic plate;
  c. developing said photographic plate;
  d. flooding said developed photographic plate with light from a single light in said data source located at position $(X_i, Y_j)$ in said data matrix; and
  e. detecting the reconstructed reference beams resulting from said last mentioned step, the detection of each reconstructed beam from each subareas being accomplished at the real image point of the reference source which was used in recording the information in the particular subarea.

9. The method as claimed in claim 8 wherein the step of exposing any subarea comprises blocking the light from exposing all other subareas.

10. The method as claimed in claim 8 wherein said data light sources are injection lasers and said reference beams are light from injection lasers.

UNITED STATES PATENT OFFICE
CERTIFICATE OF CORRECTION

Patent No. 3,542,448           Dated November 24, 1970

Inventor(s) JERRY L. REYNOLDS et al

It is certified that error appears in the above-identified patent and that said Letters Patent are hereby corrected as shown below:

Column 1, line 38 — after the period delete "creates"

Column 2, line 18 — "ejection" should be "injection"

Column 3, line 11 — "energized" should be "energizes"

Column 5, line 19 — delete "submemory" and insert "bit in each submemory as a bit in a word. The word is now distributed over all of the submemories. By exciting the ($X_i$ $Y_j$) laser"

line 22 — "A" should be "a"

line 66 — "thoughput" should be "throughput"

Column 6, line 8 — "stoorage" should be "storage"

Signed and sealed this 30th day of March 1971.

(SEAL)
Attest:

EDWARD M. FLETCHER, JR.
Attesting Officer

WILLIAM E. SCHUYLER, JR.
Commissioner of Patents